Patented Jan. 12, 1937

2,067,538

UNITED STATES PATENT OFFICE 2,067,538

PROCESS FOR MAKING DOUBLE OR TREBLE (CALCIUM) SUPERPHOSPHATE

Walter H. MacIntire, Knoxville, Tenn.

No Drawing. Application January 5, 1934,
Serial No. 705,462

4 Claims. (Cl. 23—109)

This invention relates to the manufacture of mono calcium phosphate and more particularly the double or triple or so-called "treble" superphosphate, and has for its object to provide improved methods for making this material, whereby a superior product is secured at a minimum cost and consumption of time.

As is well known, the original superphosphate procedure under the patent granted to Laws, in 1850, called for a treatment of raw rock phosphate or corresponding materials, with sulfuric acid, the product so obtained carrying a large fraction of calcium sulfate. The next step stipulated that the phosphatic materials should be treated with the relatively dilute commercial grades of phosphoric acid, the material so obtained being designated as double, triple, or "treble" superphosphate. The material so made has the advantage of a high concentration of $P_2O_5$, but it has a very objectionable physical make-up and the application of heat for drying is required.

According to the present invention the starting materials are such natural calcium carbonate substances as dry marble or other limestone, or marl or phosphatic marl and phosphoric acid. As one example of procedure an amount of dry limestone (or marl or phosphatic marl) is added to a charge of approximately 85% phosphoric acid, $H_3PO_4$, slightly less (about 0.5% less) than the quantity theoretically required to convert all of the $CaCO_3$ and $H_3PO_4$ into the mono-calcium phosphate $CaH_4(PO_4)_2.H_2O$. Since $H_3PO_4$ of 85% concentration is not appreciably reactive upon iron, the acid is placed in any suitable container, which may even be of wood, and agitated and the charge of dry limestone is added by gravity, and the agitation continued for approximately 2¼ minutes, more or less, depending upon the type and efficiency of the mixer, at the end of which time the major fraction of the reaction between the charges of $CaCO_3$ and $H_3PO_4$ will be completed and the bulk of the entire charge will be approximately twice that of the original volume of the acid, and the mass will have a consistency somewhat similar to putty. With an ordinary mixing apparatus with minimal power available, the stiff mass may then be transferred to a bin or pile to "age", or it may be allowed to "age" in the mixer for a period of from 8 to 10 minutes, in which latter case the stirring device is given an occasional turn, thereby preventing the twofold bulk of the mass from becoming further distended to a larger (four-fold) volume that would result if the mass were left quiescent in the mixer during the evolution of the latter portions of the liberated $CO_2$. During the mixing operation the temperature of the mass will range between 45 and 50° C., and a higher temperature of 75–80° C. will occur during the "aging" period, when the mass undergoes granulation and crystallization during the process of hydration. That is, the newly formed mono-calcium phosphate takes to itself one mol. of water of crystallization, the water for this crystallization effect being derived from, and being equal to about ½ of the approximately 15% water content of the approximately 85% phosphoric acid, so that no addition of water is required to carry out the process. At the end of the "aging" period the material is a relatively dry granular mass that contains meager residues of the initial limestone and of free phosphoric acid, and the product can be readily disintegrated and passed through a 20 mesh sieve.

After the previously mentioned stiffness has been attained at the end of approximately two minutes of stirring, the alternative operation of continuous stirring during both the intense initial reaction period and the subsequent period of hydration can be carried out advantageously if the mixing device is supplied with sufficient power to permit the rotation of the mixing paddles in the stiff product. This alternative operation produces a finely divided, free flowing and relatively dry crystalline product that can be readily poured from the mixer. (In any case the product may be reduced to the desired fineness by immediate screening while still hot or warm, this being preferable to later similar handling.)

The reaction is represented by the equation $CaCO_3 + 2H_3PO_4 = CaH_4(PO_4)_2.H_2O + CO_2$. This product is a calcium double, triple (or so-called "treble") superphosphate with a total $P_2O_5$ content approximating 55%; a water-soluble $P_2O_5$ content of about 52%; no citrate insoluble $P_2O_5$; and less than 1% of $P_2O_5$ as free phosphoric acid, and as little as a fraction of 1% of $CaCO_3$. Moreover, it does not attack bags or other containers and does not cake, since it does not take up an appreciable amount of moisture when exposed to the atmosphere and contains only a meager amount of fluorine. Furthermore, by the use of suitable apparatus there may be obtained as a valuable by-product as high as .44 of a ton of carbon dioxide from each ton of dry high-grade limestone employed, though normally the amount may be less than this. The figures given, including those of fineness of the dry limestone, will vary somewhat with the type of limestone employed, but by combining 100.75 parts by weight of a 99.25% 1/60–1/85 inch crystalline limestone with 227.63 parts by weight of an 85.65% phosphoric acid ($H_3PO_4$) there will be obtained approximately 268.0 parts of the relatively dry granular product indicated.

As compared with this the best double superphosphate obtained by the standard procedure of treating phosphate rock with phosphoric acid has a total $P_2O_5$ content of 45-48%; a water-insoluble $P_2O_5$ content of 3-5%; a free phosphoric acid content of about 5%; and a combined impurities (iron and aluminum oxides; $SO_3$; fluorine; silica) content of about 6-8%. It is at once apparent that the high completely "available" $P_2O_5$ content of the granular product of the present invention, the absence of "citrate-insoluble" $P_2O_5$ and the negligible amount of residual free phosphoric acid stamp it as a very high-grade double superphosphate, and its small bulk and comparative freedom from tendency to absorb moisture from the atmosphere greatly facilitate packing in bags and transportation and storage, whereas the minimum of impurities and the large amount of valuable carbon dioxide produced as a byproduct are additional features of importance. The product obtained immediately by the present process also contains less moisture than does the product obtained by the conventional process. Moreover the entire process is completed within a few minutes without necessity for protracted curing, and no drying by heat, as heretofore practiced, is necessary.

The present process has further advantages in that only simple and conventional equipment and no expert chemical control are required when the purity of the limestone and phosphoric acid are known, and these values are furnished by the producers of these two raw materials. Furthermore, no obnoxious fumes of fluorine gas are encountered in the present operation and hence no provision is required for handling and abating the nuisance of objectionable and deleterious fluorine gases that is encountered in the standard process of treating fluorine-carrying natural phosphate rock with phosphoric acid. In addition, in the present process the reaction between an alkaline-earth carbonate and a weak mineral acid such as phosphoric acid can be carried more closely to completion, and hence can be computed much more closely on a stoichometrical basis than is possible when a neutral phosphate rock is treated with phosphoric acid to effect a replacement of two of the three calcium units in the tri-calcium phosphate molecule. The partial replacement of the hydrogen content of the phosphoric acid by the calcium of limestone is accomplished by a disruption that is characterized by the evolution of a gas, carbon dioxide, whereas the reaction between the tri-calcium phosphate and phosphoric acid is not so characterized. This complete displacement of the $CO_2$ content of the limestone is an important feature in the present process, since it tends to increase the surface and thereby produces an open product of good mechanical condition which facilitates the production of a material suitable for drilling. Another advantage lies in the fact that the starting solid materials such as limestone, marl and phosphatic marl, are found widely distributed as remarkably pure natural products, whereas a phosphate rock of more than 70% purity is unusual.

While the use of phosphoric acid of approximately 85% concentration is preferred and has been found to give the best results, phosphoric acid of a lower concentration (65%) may be employed, in which case a larger container is necessary. Moreover, the resultant product is not as dry as the product obtained by the use of $H_3PO_4$ of the preferred concentration and the dilution of the phosphoric acid results in a more violent ebullition accompanying the evolution of the carbon dioxide. Furthermore, the resultant product attains a mechanical condition of lightness that is not as desirable as the more crystalline nature of the denser and more readily flowing product obtained by the preferred usage of approximately 85% acid. It will also be found that the lower concentration of the acid is more reactive toward metal containers and stirrers. It will therefore be understood that where these features are not deemed to be of controlling importance an acid solution as low as 65% $H_3PO_4$ may be employed.

The proportions and purity and the fineness of materials employed, as well as the time element entering into the process, are those which have been found to give the best results, but it will be understood that these are given for the purpose of explaining the invention rather than as defining the limits of the invention for which latter purpose reference is had to the appended claims.

Having thus described the invention, what is claimed is:

1. The process of making calcium double or triple superphosphate which consists in mixing high-grade comminuted dry limestone with phosphoric acid ($H_3PO_4$) of approximately 85% concentration in the proportions of 100 parts $CaCO_3$ to approximately 230 parts $H_3PO_4$, agitating the mixture for approximately two and one quarter minutes, and then permitting the mixture to stand for approximately eight to ten minutes and then again agitating the mixture until granulation occurs.

2. The process which consists in placing phosphoric acid ($H_3PO_4$) of approximately 85% concentration in a container, adding comminuted high-grade dry limestone to the acid by gravity in the proportion of approximately 230 parts $H_3PO_4$ to 100 parts $CaCO_3$, agitating the mixture, then permitting said mixture to become quiescent, and then again agitating the mass after a period of about eight or ten minutes.

3. The process which consists in placing phosphoric acid of approximately 85% concentration in a container, adding comminuted dry limestone of approximately 99% grade to the acid, the same being in the proportions of about 228 parts by weight of the acid to about 100 parts by weight of the limestone, then agitating the mixture for approximately two and one quarter minutes, then permitting the mass to become quiescent for a period of from eight to ten minutes and then again stirring the mixture to induce granulation.

4. The process which consists in adding comminuted rock-like material containing a large percentage of calcium carbonate to a concentrated phosphoric acid solution in the proportion of 100 parts $CaCO_3$ to approximately 196 parts absolute $H_3PO_4$ and then agitating the mixture during the initial reaction and then after a period of rest of approximately eight to ten minutes agitating the mass during the subsequent period of hydration.

WALTER H. MacINTIRE.